C. B. BRADFORD.
LUBRICATOR.
APPLICATION FILED APR. 24, 1920.
1,419,210.
Patented June 13, 1922.
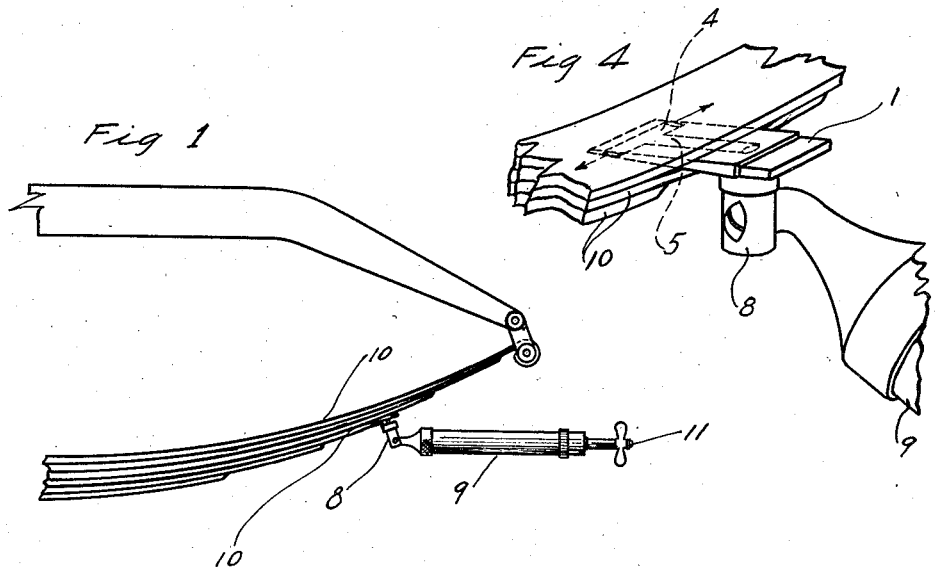
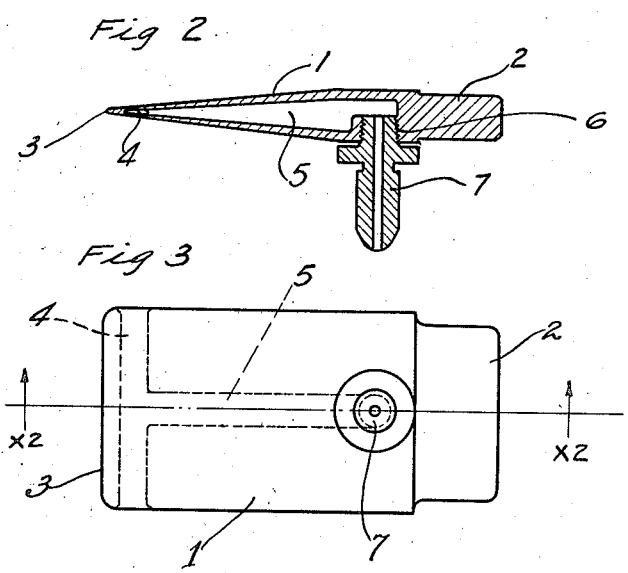
INVENTOR.
Charles B. Bradford
BY Frederick Whyou
ATTORNEY

UNITED STATES PATENT OFFICE.

CHARLES B. BRADFORD, OF BAKERSFIELD, CALIFORNIA, ASSIGNOR TO CRITZ MANUFACTURING COMPANY, OF SANTA MARIA, CALIFORNIA, A CORPORATION OF CALIFORNIA.

LUBRICATOR.

1,419,210.        Specification of Letters Patent.    Patented June 13, 1922.

Application filed April 24, 1920. Serial No. 376,204.

*To all whom it may concern:*

Be it known that I, CHARLES B. BRADFORD, a citizen of the United States, residing at Bakersfield, in the county of Kern and State of California, have invented a new and useful Lubricator, of which the following is a specification.

This invention relates to a lubricator of the character capable of being forced between two frictionally engaging members so that a lubricant may be forced between the members to lubricate the adjacent faces thereof. The invention is capable of use in connection with any lubricant gun, and is especially serviceable in connection with a lubricant gun of the type disclosed in patent issued to Edward Coe Critchlow for lubricating system, No. 1,325,002, dated December 16, 1919.

An object of the invention is to make provision for applying a lubricant between two members such, for example, as the adjacent leaves of a leaf spring of the type employed for yieldingly supporting a vehicle frame on the wheels.

Another object is to make provision for ready attachment of the lubricator to a lubricant gun.

Other objects and advantages will appear in the subjoined detailed description.

The accompanying drawings illustrate the invention.

Figure 1 is a side elevation of fragments of a vehicle spring and frame with the invention applied between adjacent leaves of the spring in position for applying lubricant between said spring leaves. A lubricant gun is also shown connected with the lubricator.

Fig. 2 is a sectional elevation of the lubricator on line indicated by $x^2$—$x^2$, Fig. 3.

Fig. 3 is an inverted plan view of the lubricator.

Fig. 4 is a perspective view of a fragment of vehicle spring with the lubricator positioned differently than in Fig. 1.

There is provided a wedge-shaped body 1 having a head 2 at the end opposite to the thinner entering end edge 3 of the body. The body 1 is provided adjacent the end edge 3 with transversely extending duct branches 4 and said body is also provided with a longitudinally extending duct portion 5 communicating at one end with the duct branches 4. The duct opens at the side edges of the body to the surface thereof. At its thicker end the duct communicates with an opening 6 which may be screw-threaded to receive a nipple 7 that forms suitable connection means between the body 1 and the nozzle 8 of a lubricant gun indicated in general by the character 9. The lubricant gun constitutes means to supply lubricant under pressure to the duct 4, 5 and may be of any suitable construction such, for example, as that disclosed in the above identified patent.

From the foregoing it is clear that the duct 4, 5 opens laterally near the thinner end of the body and also near the thicker end of said body 1 and that the duct opens to the surface in at least two places.

To use the invention the body 1 will be forced between adjacent spring leaves 10 as shown in Figs. 1 and 4 of the drawings. To do this it may be necessary to tap the head 2 with a hammer or other suitable tool so as to drive the body 1 between the spring leaves. In Fig. 1 the lubricator body is shown positioned adjacent the end of the lower spring leaf of the two between which it is inserted, and is shown as being inserted endwise with respect to the spring, whereas in Fig. 4 the lubricator body is shown inserted at the side of the spring. If desired, the lubricator may be inserted along the side of the spring at different places so as to produce films of lubricant from end to end of the spring between adjacent leaves.

After the body 1 is thus in place between the spring leaves, the lubricant gun 9 will be connected with the body 1 and, in this particular instance, the connection is effected by slipping the nozzle 8 over the nipple 7. Then the plunger rod 11 of the lubricant gun 9 will be operated to cause the plunger, not shown, of the gun to force lubricant from the gun through the nozzle 8 and nipple 7 to the duct 4, 5 and from said duct into the space between the spring leaves 10, such space being produced adjacent the side edges of the lubricator by wedging apart of the spring leaves by the lubricator body 1, the body 1 preferably being narrower than the spring leaves when the body is inserted at one end of the leaves as in Fig. 1.

When the body is inserted at the side of the spring, as in Fig. 4, the lubricant will be ejected from the duct 4, 5 toward both ends of the spring, as indicated by the dotted arrows, thus to lubricate a considerable area of the spring adjacent the point of insertion of the body.

When the desired amount of lubricant has thus been injected at one point between two adjacent spring leaves 10, the gun will be disconnected from the nipple 7 and the lubricator body 1 will be driven from between said spring leaves and will then be inserted in another position between the same spring leaves and lubricant supplied in the same manner as above described. The adjacent surfaces of all of the spring leaves will be lubricated in this manner.

The invention is not limited to the exact details of construction described above and shown in the drawings, but the invention also includes such changes and modifications as may lie with the spirit and scope of the invention as defined in the appended claim.

I claim:

In a lubricator, a wedge-shaped body having a duct opening laterally nearer the thinner end of the body to the surface thereof, the thicker end of the body forming a head by which the wedge may be driven, and a nipple inserted in one of the flat faces of the wedge and communicating with the duct, said nipple being adapted for communication with lubricant-supplying means.

Signed at Bakersfield, Cal., this 10th day of April, 1920.

CHARLES B. BRADFORD.

Witnesses:
G. E. Erb,
John Irwin Walton.